United States Patent [19]

Yamabe et al.

[11] 4,436,773

[45] Mar. 13, 1984

[54] ANTICORROSIVE COATING PROCESS

[75] Inventors: Masaaki Yamabe, Machida; Hiromichi Higaki, Yokohama; Toshio Shinohara, Yokohama; Hiroyuki Tanabe, Yokohama; Shunsuke Nakayama, Yokohama, all of Japan

[73] Assignees: Dai Nippon Toryo Co., Ltd., Osaka; Asahi Glass Company Ltd., Tokyo, both of Japan

[21] Appl. No.: 460,383

[22] Filed: Jan. 24, 1983

[30] Foreign Application Priority Data

Feb. 5, 1982 [JP] Japan .................................. 57-16359
Feb. 5, 1982 [JP] Japan .................................. 57-16360

[51] Int. Cl.$^3$ ............................................. B05D 3/02
[52] U.S. Cl. .................................. 427/380; 427/383.7; 427/385.5; 427/386; 427/388.1
[58] Field of Search .................. 427/380, 383.7, 385.5, 427/386, 388.5, 388.1

[56] References Cited

U.S. PATENT DOCUMENTS 4,345,057  8/1982  Yamabe et al. .................... 526/247

Primary Examiner—Bernard D. Pianalto
Attorney, Agent, or Firm—Oblon, Fisher, Spivak, McClelland & Maier

[57] ABSTRACT

An anticorrosive coating process comprises:
(i) a step of forming a primer coating layer by applying on a substrate an oil-type anticorrosive coating or an alkyd resin-type anticorrosive coating as a primer coating, followed by air-drying,
(ii) a step of forming a binder coating layer by applying on the primer coating layer a phenol-modified alkyd resin-type coating containing a flaky pigment, followed by air-drying, and
(iii) a step of forming a top coating layer by applying on the binder layer a top coating comprising (a) a fluorine-containing copolymer composed of from 40 to 60 molar % of a fluoroolefin, from 5 to 45 molar % of cyclohexylvinyl ether, from 5 to 45 molar % of an alkylvinyl ether, from 3 to 15 molar % of a hydroxyalkylvinyl ether and from 0 to 30 molar % of other comonomer and (b) a polyisocyanate, followed by air-drying.

12 Claims, No Drawings

ANTICORROSIVE COATING PROCESS

The present invention relates to an anticorrosive coating process for forming on a substrate a coating layer which has superior strength and which provides extremely good weatherability and corrosion preventing effect.

For the protection of steel structures installed in the open air from corrosion, it has been common to apply a primer coating for the purposes of preventing the penetration of water or corrosive substances, improving the adhesion to the metal surface and preventing the corrosion by means of an anticorrosive pigment, then optionally apply an intermediate coating for the purposes of improving the adhesion between the primer coating layer and a top coating layer, coordinating the physical property differences between the primer coating layer and the top coating layer and increasing the coating layer thickness, and further apply the top coating to improve the outer appearance, weatherability and mechanical strength. Oil-type anticorrosive coatings or alkyd resin anticorrosive coatings have an advantage that they can be applied to a poorly prepared substrate surface corresponding to the level of the Surface Preparation of Steel Structures Painting Manual SP-3 (Steel Structures Painting Council, U.S.A.), and they are widely used as the primer coating.

As the top coating, alkyd resin-type coatings or chlorinated rubber-type coatings are widely used. However, with such conventional top coating systems, durability of the coatings is rather limited and the corrosion protection and weatherability for an extended period of time can not be expected. Accordingly, it used to be required to recoat them at an interval of every five to six years or in some cases every two to three years depending upon the particular resins used.

On the other hand, reflecting the recent trend for larger steel structures such as bridges or tanks, there is an increasing tendency for an increase of the costs and the number of process steps required for the recoating. Accordingly, there is a strong demand for a coating system which provides effective corrosion prevention and weatherability for a long period of time, that is, a coating system having a long cycle for the recoating.

In a corrosion reaction of the coated steel structure which takes place in a neutral environment as in the atmosphere, the cathode reaction for corrosion is usually governed by the oxygen reduction reaction, and accordingly the oxygen permeability of the coating layer becomes critical.

When it is taken into accounts that the oxygen reduction reaction governs the cathode reaction for corrosion, the limiting current density ($I_{max}$) corresponding to the corrosion rate of the steel beneath the coating layer is represented by the following equations.

$$I_{max} = M_{max} \cdot n \cdot F$$
$$= K \cdot Co \cdot nF/d$$

where
$M_{max}$: amount of dissolved oxygen for diffusion,
K: diffusion coefficient of oxygen,
d: the thickness of the diffusion layer (thickness of the coating layer),
n: reactive electron number,
F: Faraday's constant,
Co: oxygen concentration.

Accordingly, in order to reduce the corrosion rate of the steel beneath the coating layer, it is necessary either to substantially increase the thickness of the coating layer or to reduce the oxygen permeability, that is, the amount of the dissolved oxygen for diffusion or the diffusion coefficient of oxygen if the thickness of the coating layer is maintained to be constant. Further, it is necessary to prevent the reduction of the thickness of the coating layer due to e.g. chalking, for a long period of time. If the oxygen permeability of the coating layer is reduced to a half, the corrosion rate of the steel beneath the coating layer will likewise be reduced to one half. Thus, the oxygen permeability of the coating layer is critical to the lasting corrosion prevention of the coated steel structures.

However, an alkyd resin or chlorinated rubber used as a vehicle in the top coating as mentioned above, has a relatively great oxygen permeability, whereby the corrosion of the steel beneath the coating layer is facilitated and the coating defects are likely to be led. Further, in the abovementioned top coating, the resin and pigment are likely to be deteriorated by the exposure to e.g. ultra-violet ray, and discoloration, chalking or the formation of cracks is likely to take place, thus leading to a decrease of the gloss or color fading. Thus, long lasting corrosion prevention or weatherability can not thereby be expected.

Further, a silicone resin has recently been developed as a resin having good weatherability and its application as a top coating has been attempted.

However, air-drying type silicone-alkyd resins or silicone-acrylic resins have a relatively great oxygen permeability and do not provide adequate corrosion prevention for the steel beneath the coating layer although they may improve the weatherability of the top coating. Further, the top coating thereby obtained tends to be soft and susceptible to staining and scratching. At the same time, it has an additional drawback that the resin undergoes whitening. Although the abovementioned resin undergoes no degradation and maintains the initial gloss for a long period of time, the pigment in the surface layer of the coating tends to fade and thus undergoes substantial color change, and after all, such a top coating is inadequate for use for a long period of time.

Accordingly, it is an object of the present invention to overcome such various difficulties in the conventional coatings and to provide an anticorrosive coating process which is capable of providing a coating system having a long lasting corrosion preventing property and long lasting weatherability.

Namely, the present invention provides an anticorrosive coating process which comprises:

(i) a step of forming a primer coating layer by applying on a substrate an oil-type anticorrosive coating or an alkyd resin-type anticorrosive coating as a primer coating, followed by air-drying, (ii) a step of forming a binder coating layer by applying on the primer coating layer a phenol-modified alkyd resin-type coating containing a flaky pigment, followed by air-drying, and (iii) a step of forming a top coating layer by applying on the binder layer a top coating comprising (a) a fluorine-containing copolymer composed of from 40 to 60 molar % of a fluoroolefin, from 5 to 45 molar % of cyclohexylvinyl ether, from 5 to 45 molar % of an alkylvinyl ether, from 3 to 15 molar % of a hydroxyalkylvinyl ether and from 0 to 30 molar % of other comonomer and (b) a polyisocyanate, followed by air-drying.

The present invention also provides an anticorrosive coating process which comprises:

(i) a step of forming a primer coating layer by applying on a substrate an oil-type anticorrosive coating or an alkyd resin-type anticorrosive coating as a primer coating, followed by air-drying, (ii) a step of forming a binder coating layer by applying on the primer coating layer a phenol-modified alkyd resin-type coating containing a flaky pigment, followed by air-drying, (iii) a step of forming a sealer coating layer by applying on the binder coating layer an epoxy resin coating, followed by air-drying, and (iv) a step of applying thereon a top coating comprising (a) a fluorine-containing copolymer composed of from 40 to 60 molar % of a fluoroolefin, from 5 to 45 molar % of cyclohexylvinyl ether, from 5 to 45 molar % of an alkylvinyl ether, from 3 to 15 molar % of a hydroxyalkylvinyl ether and from 0 to 30 molar % of other comonomer and (b) a polyisocyanate, followed by air-drying.

Now, the present invention will be described in detail with reference to the preferred embodiments.

The oil-type anticorrosive coating to be used as the primer coating in the anticorrosive coating process of the present invention is a coating which comprises, as a vehicle, a drying oil or semi drying oil such as linseed oil, soybean oil, tung oil, safflower oil or cotton seed oil, or a boiled oil thereof and an anticorrosive pigment such as red lead, lead suboxide, basic lead chromate, lead cyanamide, zinc dust, zinc chromate, red-lead zinc chromate or calcium plumbate. The content of the anticorrosive pigment in the oil type anticorrosive coating is usually from 5 to 50% by weight. However, in the case of the lead pigment or zinc dust pigment, the upper limit may be as high as 90% by weight.

The alkyd resin-type anticorrosive coating to be used for the process of the present invention is a coating obtained by mixing the abovementioned anticorrosive pigment with an alkyd resin having an oil length of from 45 to 65% and an acid value of not more than 10 mg KOH/g, as a vehicle. The alkyd resin is obtainable by a condensation reaction of a mixture comprising a polybasic acid such as phthalic anhydride, isophthalic acid, terephthalic acid, maleic anhydride, tetrachlorophthalic anhydride, adipic acid, succinic acid or a rosin-maleic anhydride adduct or a mixture of such a polybasic acid with a monobasic acid such as benzoic acid or p-tert-butyl benzoic acid; a polyhydric alcohol such as ethylene glycol, propylene glycol, diethylene glycol, neopentyl glycol, glycerine, trimethylol ethane, trimethylol propane, pentaerythritol or sorbitol; and an oil such as linseed oil, sardine oil, tung oil, dehydrated caster oil, safflower oil, soybean oil or cotton seed oil, or a fatty acid, at a temperature of about 200° to 250° C. for about 6 to 20 hours in accordance with a usual method.

The content of the anticorrosive pigment in the alkyd resin anticorrosive coating is substantially the same as in the case of the abovementioned oil-type anticorrosive coating.

Such an oil-type anticorrosive coating or alkyd resin-type anticorrosive coating is represented by, for instance, red lead anticorrosive paint (JIS K-5622), lead suboxide anticorrosive paint (JIS K-5623), basic lead chromate anticorrosive paint (JIS K-5624), lead cyanamide anticorrosive paint (JIS K-5625), zinc dust anticorrosive paint (JIS K-5626), zinc chromate anticorrosive paint (JIS K-5627) and red-lead zinc chromate anticorrosive paint (JIS K-5628).

The above oil-type anticorrosive coating or alkyd resin-type anticorrosive coating has a merit in that it can be applied even to a relatively poorly prepared substrate surface at a level of Surface Preparation of Steel Structures Painting Manual SP-3 (Steel Structures Painting Council, U.S.A.).

Whereas, the phenol-modified alkyd resin coating to be used as a binder coating in the process of the present invention, is a coating in which a resin is obtained by the condensation copolymerization of said alkyd resin with phenol formaldehyde. In the phenol formaldehyde-modified resin, the phenol formaldehyde content is usually about from 3 to 30% by weight.

The coating to be used as the binder coating is composed of said phenol-modified alkyd resin and a flaky pigment.

As the flaky pigment, there may be used one or more pigment such as micaceous iron oxide, glass flakes and aluminum powder.

The solid content weight ratio of the flaky pigment to said phenol-modified alkyd resin vehicle is preferably from 40 to 150 parts by weight per 100 parts of the phenol-modified alkyd resin vehicle.

To the abovementioned phenol-modified alkyd resin-type binder coating, there may optionally be added, in addition to the flaky pigment, other additives which are commonly used for coating material. Such additives include an organic or inorganic coloring pigment, an extender pigment, a dispersion stabilizer, a viscosity controlling agent and a leveling agent.

The binder coating may be obtained by mixing the phenol-modified alkyd resin, the flaky pigment and other additives, if necessary, together with an organic solvent which is commonly used for coatings and kneading the mixture by means of a kneader such as a disperser which is commonly used for the preparation of coatings.

The epoxy resin coating to be used as a sealer coating in the process of the present invention, is a coating composed of a main component obtained by mixing an epoxy resin having at least two epoxy groups in its molecule as a vehicle, with commonly used coloring pigment, extender pigment, precipitation preventing agent, dispersing agent and diluent, and an amino-type hardener.

As such an epoxy resin, there may be mentioned, for instance, a bisphenol-type epoxy resin such as the one known by the trade name Epikote 828, 834, 836, 1001, 1004 or DX-255 manufactured by Shell Chemical Co., the one known by the trade name Araldite GY-260 manufactured by Ciba Geigy Corp., the one known by the trade name DER 330, 331 or 337 manufactured by Dow Chemical Co., or the one known by the trade name Epiclon 800 manufactured by Dainippon Ink & Chemicals Inc.; a phenol novolak-type epoxy resin such as the one known by the trade name DEN 431 or 438 manufactured by Dow Chemical Co.; a polyglycol-type epoxy resin such as the one known by the trade name Araldite CT-508 manufactured by Ciba Geigy Corp., or the one known by the trade name DER-732 or 736 manufactured by Dow Chemical Co.; an ester-type epoxy resin such as the one known by the trade name Epiclon 200 or 400 manufactured by Dainippon Ink & Chemicals Inc.; or a linear aliphatic epoxy resin such as an epoxyrated polybutadiene known by the trade name BF-1000 manufactured by Nippon Soda Co.

It should be understood that other epoxy compounds and the derivatives of the abovementioned resins fall within the scope of the present invention so long as they are readily inferred from the abovementioned resin. For instance, as such compounds or derivatives, there may be mentioned polyol-type epoxy resins, cyclic epoxy resins and halogen-containing epoxy resins.

As the hardener for the abovementioned epoxy resin, there may be used an amino-type hardener which is commonly used for coatings, such as a polyamine, an amine adduct or a polyamide resin.

As the amino-type hardener to be used in the present invention, there may be mentioned commercially available polyamide resins such as those known by the trade names Tohmide Y-25, Y-245, Y-2400 and Y-2500, manufactured by Fuji Chemical Industry Co., Ltd., those known by the trade names Genamid 2000 and Versamid 115 and 125, manufactured by Dai-Ichi General Co., Ltd., those known by the trade names Sunmide 320, 330 and X 2000, manufactured by Sanwa Chemical Industry Co., Ltd., and those known by the trade names Epikure 3255 and 4255, manufactured by Yuka Shell Epoxy Co., Ltd.; amine adduct resins such as those known by the trade names Tohmide 238 and Fujicure #202, manufactured by Fuji Chemical Industry Co., Ltd., and those known by the trade names Adeka Hardener EH-531, manufactured by Asahi Electro-Chemical Co., Ltd.; aliphatic polyamines such as those known by the trade names Sunmide T-100, D-100 and P-100, manufactured by Sanwa Chemical Indusdry Co., Ltd. and heterocyclic diamine derivatives such as those known by the trade names Epomate B-002, C-002 and S-005, manufactured by Ajinomoto Co., Ltd.

The amount of addition of the hardener to the epoxy resin is usually about the equivalent amount, i.e. within a range of from 0.7 to 1.3 equivalent per equivalent of the epoxy resin.

Further, a polyisocyanate may be used as a hardener for the abovementioned epoxy resin.

The polyisocyanate is a polyfunctional isocyanate having at least two isocyanate groups per molecule. For instance, there may be mentioned polyisocyanates such as ethylenediisocyanate, propylenediisocyanate, tetramethylenediisocyanate, hexamethylenediisocyanate, decamethylenediisocyanate, m-phenylene-diisocyanate, p-phenylene-diisocyanate, 2,4-tolylene-diisocyanate, 2,6-tolylene-diisocyanate, 1,5-naphthylenediisocyanate, 4,4',4"-triphenylmethane-triisocyanate, 4,4'-diphenylmethane-diisocyanate, 3,3'-dimethyl-4,4'-diphenylene-diisocyanate, m-xylylene-diisocyanate, p-xylylene-diisocyanate, isophoronediisocyanate and lysineisocyanate; polyisocyanates which are obtained by an addition reaction of the excess amount of the abovementioned isocyanate compounds with a low molecular weight polyol such as ethylene glycol, propylene glycol, 1,3-butylene glycol, neopentyl glycol, 2,2,4-trimethyl-1,3-pentanediol, hexamethylene glycol, cyclohexanedimethanol, trimethylolpropane, hexanetriol, glycerine or pentaerythritol; and burette structured polyisocyanates or allophanate structured polyisocyanates. The mixing ratio of the abovementioned epoxy resin with the polyisocyanate is preferably within the range such that the hydroxy groups in the epoxy resin/the isocyanate groups in the polyisocyanate is from 1/1.3 to 1/0.5 (equivalent ratio).

In one embodiment of the present invention, a flaky pigment is incorporated in the abovementioned epoxy resin coating. The flaky pigment may be the same kind of the flaky pigment as used in the afore-mentioned binder coating layer. The flaky pigment is added in an amount of from 40 to 150 parts by weight per 100 parts by weight of the epoxy resin.

In addition to the flaky pigment, an organic or inorganic coloring pigment, an extender pigment, an organic solvent, a dispersion stabilizer, a viscosity controlling agent, a levelling agent or any other additives which are commonly used in conventional coatings, may optionally be added to the afore-mentioned epoxy resin coating used as a sealer coating in the present invention.

The sealer coating may be prepared by firstly adding the flaky pigment, other pigments, additives or solvents to the epoxy resin and kneading the mixture by means of a kneader such as a disperser or roll mill which is commonly used for the preparation of the coatings, to obtain a main component and mixing to the main component a hardener diluted with an organic solvent at the time of the application of the coating.

Further, the fluorine-containing copolymer to be used as the top coating in the anticorrosive coating process of the present invention comprises, as essential components, a fluoroolefin, a cyclohexylvinyl ether, an alkylvinyl ether and a hydroxyalkylvinyl ether in amounts of from 40 to 60 molar %, from 5 to 45 molar %, from 5 to 45 molar % and from 3 to 15 molar %, respectively, preferably from 45 to 55 molar %, from 10 to 30 molar %, from 10 to 35 molar % and from 5 to 13 molar %, respectively.

If the fluoroolefin content is too low, no adequate weatherability will be obtainaed, and there will be a difficulty in the production of the copolymer. On the other hand, if the fluoroolefin content is too high, the production of the copolymer will be more difficult. Whereas, if the cyclohexylvinyl ether content is too low, the hardness of the coating layer thereby obtained will be too low. If the alkylvinyl ether content is too low, the flexibility of the coating layer thereby obtained will be too low.

For the improvement of the hardness of the coating layer without impairing various desirable properties as the coating base, it is particularly important that the fluorine-containing copolymer to be used for the anticorrosive coating process of the present invention contains the hydroxyalkylvinyl ether in an amount of the abovementioned range. Namely, if the hydroxyalkylvinyl ether content is too high, the solubility of the copolymer will be changed, and the copolymer tends to be soluble only in a special solvent such as an alcohol, whereby not only the usefulness as the solvent-coating base is restricted but also the flexibility of the hardened coating layer will be decreased, and moreover the gelation time (pot life) in the presence of a hardener will be shortened, thus substantially impairing the applicability of the coating. Further, if the hydroxyalkylvinyl ether content is too low, no adequate improvement of the hardness will be obtainable, whereby a longer curing time will be required and the solvent resistance or stain resistance of the hardened coating layer will be too low, and further the adhesion to the intermediate synthetic resin coating layer will be impaired.

As the fluoroolefin to be used as a component of the fluorine-containing copolymer, a perhaloolefin, especially chlorotrifluoroethylene or tetrafluoroethylene, is preferably used. As the alkylvinyl ether, an alkylvinyl ether containing a straight chain or branched chain alkyl group having 2 to 8 carbon atoms, especially the one having an alkyl group of 2 to 4 carbon atoms, is preferably used. The fluoroolefins and the alkylvinyl ethers may respectively be used alone or in combination as their mixtures.

The abovementioned fluorine-containing copolymer may contain, in addition to the abovementioned four essential components, other comonomer units in an amount not exceeding 30 molar %. As such comonomers, there may be used olefins such as ethylene, propylene and isobutylene, haloolefins such as vinyl chloride and vinylidene chloride, unsaturated carboxyrates such as methylmethacrylate, vinyl carboxylates such as vinyl acetate and vinyl n-butyrate.

As the abovementioned fluorine-containing copolymer, it is preferred to use those having an intrinsic viscosity of from 0.05 to 2.0 dl/g, particularly from 0.07 to 0.8 dl/g, as measured in tetrahydrofurane at 30° C. If the viscosity is too low, the mechanical strength will be too low, whereas if the viscosity is too high, the applicability will be impaired since it will then be required to lower the concentration of the solution to bring the viscosity to a level suitable for use as a solvent-type coating.

The abovementioned fluorine-containing copolymer may be prepared by subjecting a mixture of predetermined proportions of the monomers to a copolymerization reaction in the presence or absence of a polymerization medium and with use of a polymerization initiator such as a water-soluble initiator or an oil-soluble initiator, or a polymerization initiating source such as an ionizing radiation.

When the fluorine-containing copolymer thus obtained is to be used as a top coating, various solvents can be used. For instance, there may be mentioned an aromatic hydrocarbon such as xylene or toluene, an alcohol such as n-butanol, an ester such as butyl acetate, a ketone such as methylisobutyl ketone, and a glycol ether such as ethyleneglycol monoethyl ether. Further, commercially available various thinners may also be used.

The mixing of the copolymer with the solvent can be conducted by means of various apparatus commonly used in the preparation of the coatings, such as a ball mill, a paint shaker, a sand mill, a jet mill, triple roll mill or a kneader. At this stage, an organic pigment, an inorganic pigment (including a calcined pigment, an extender pigment and a metal pigment), a dispersion stabilizer, a viscosity controlling agent, a leveling agent, an anti-gelling agent or an ultraviolet absorbing agent may be incorporated.

According to the coating process of the present invention, the fluorine-containing copolymer solution or the dispersion obtained by dispersing the pigment, etc., thus obtained, will be combined with a polyisocyanate at the time of the application of the coating.

The polyisocyanate is a polyfunctional isocyanate having at least two isocyanate groups in its molecule. For instance, there may be mentioned polyisocyanates such as ethylenediisocyanate, propylene-diisocyanate, tetramethylenediisocyanate, hexamethylenediisocyanate, decamethylenediisocyanate, m-phenylene-diisocyanate, p-phenylene-diisocyanate, 2,4-tolylene-diisocyanate, 2,6-tolylene-diisocyanate, 1,5-naphthylene-diisocyanate, 4,4',4''-triphenylmethane-triisocyanate, 4,4'-diphenylmethane-diisocyanate, 3,3'-dimethyl-4,4'-diphenylene-diisocyanate, m-xylylene-diisocyanate, p-xylylene-diisocyanate, isophoronediisocyanate and lysineisocyanate; polyisocyanates which are obtained by an addition reaction of the excess amount of the abovementioned isocyanate compounds with a low molecular weight polyol such as ethylene glycol, propylene glycol, 1,3-butylene glycol, neopentyl glycol, 2,2,4-trimethyl-1,3-pentanediol, hexamethylene glycol, cyclohexanedimethanol, trimethylolpropane, hexanetriol, glycerine or pentaerythritol; and burette structured polyisocyanates or allophanate structured polyisocyanates.

Among the afore-mentioned polyisocyanates, particularly useful are non-yellowing diisocyanates such as hexamethylene-diisocyanate and isophoronediisocyanate and their adducts.

The fluorine-containing copolymer and the polyisocyanate are mixed in such a ratio that the hydroxy groups in the fluorine-containing copolymer/the isocyanate groups in the polyisocyanate is within the range of from 1/1.3 to 1/0.5 (equivalent ratio).

Further, to facilitate the reaction between the fluorine-containing copolymer and the polyisocyanate, a conventional catalyst such as dibutyl tin dilaurate may be added.

In the first embodiment of the anticorrosive coating process of the present invention, the abovementioned oil-type anticorrosive coating or alkyd resin-type anticorrosive coating is applied once or more times by a conventional manner with use of a brush, a roller or a spray coating machine onto the substrate with its surface pretreated to a level of at least equal to Surface Preparation of Steel Structures Painting Manual SP-3 (Steel Structures Painting Council, U.S.A.) to give a dried layer thickness of from about 50 to about 100 microns, followed by air-drying. Usually, the primer coating layer will be formed in a week by the air drying.

Onto the primer coating layer, the abovementioned phenol-modified alkyd resin coating will then be applied once or more times by means of a brush, a spray coating machine or a roller coating machine, to give a dried layer thickness of from about 30 to about 80 microns, followed by air-drying. Usually, the binder coating layer will be formed in about 3 to 7 days.

The binder coating layer formed of the phenol-modified alkyd resin is interposed between the primer coating layer and the top coating layer and serves to improve the adhesion of the layers and at the same time to prevent the lifting of the primer coating layer which is otherwise caused by the solvent contained in the top coating. In the case of other binder coatings which are likely to undergo chalking or degradation of the coating layer in a relatively short period of time, it is required to apply a top coating thereon within one or two months at the latest. Whereas, the binder coating used in the process of the present invention has no such drawbacks and the period for the application of the top coating may be extended as much as more than 12 months.

Finally, a top coating prepared immediately prior to the application by mixing the afore-mentioned fluorine-containing copolymer with the polyisocyanate, is applied once ore more times onto the binder coating layer by means of a brush, a spray coating machine or a roller coating device, to give a dried layer thickness of from about 15 to about 70μ, followed by air-drying. Usually, the top coating layer will be formed in 2 to 4 days by the air-drying.

In the second embodiment of the anticorrosive coating process of the present invention, the afore-mentioned oil-type anticorrosive coating or alkyd resin-type anticorrosive coating is likewise applied once or more times to a substrate with its surface pretreated to level at least equal to the Surface Preparation of Steel Structures Painting Manual SP-3 (Steel Structures Painting Council, U.S.A.) by means of a brush, a spray coating machine or a roller coating device, to give a dried layer thickness of about 50 to about 100μ, followed by air-dyring. Usually, the primer coating layer is formed in a week by the air-drying.

Then, onto the primer coating layer, the afore-mentioned phenol-modified alkyd resin-type coating is applied once or more times by means of a brush, a spray coating machine or a roller coating device to give a dried layer thickness of about 30 to about 80μ, followed by air-drying. Usually, the binder coating layer is formed in three to seven days by the air-drying.

The binder coating layer formed of the phenol-modified alkyd resin is interposed between the primer coating layer and the sealer coating layer and serves to improve the adhesion of the layers and at the same time to prevent the lifting of the primer coating layer which is otherwise caused by the solvent contained in the sealer coating layer. In the case of other binder coatings which are likely to undergo chalking or degradation of the coating layer in a relatively short period of time, it is required to apply a sealer coating thereon within one or two months at the latest after the formation of the binder coating layer. Whereas, the binder coating used in the process of the present invention has no such drawbacks and the period for the application of the sealer coating may be extended as much as more than 12 months.

Then, onto the binder coating layer, a sealer coating comprising the abovementioned epoxy resin as the vehicle is applied once or more times by means of a brush, a spray drying machine or roller coating device to give a dried layer thickness of about 10 to 50μ, followed by air-drying. Usually, sealer coating layer is formed in four hours to five days by the air-drying.

The sealer coating serves to shorten the interval required for application of the top coating. Namely, the interval (i.e. the shortest period of time) required for application of a top coating after the formation of the phenol-modified alkyd resin-type binder coating layer is usually at least three days because the binder coating is an oxydation polymerization-type, and yet the drying of the binder coating tends to be incomplete because of the strong solvent contained in the top coating. Such difficulties or incomveniences can be eliminated by the application of the above-mentioned epoxy resin-type sealer coating onto the binder coating layer.

Further, by providing a sealer coating which contains a flaky pigment mixed with the abovementioned epoxy resin coating, the adhesion of the top coating can further be improved and at the same time the weatherability of the sealer coating layer can be improved, whereby the maximum interval for the application of the top coating can be extended.

Thus, in the second embodiment of the present invention, by virtue of the sealer coating, the minimum interval for the application of the top coating can be shortened and at the same time the maximum interval for the application of the top coating can be extended, whereby the range of the timing for the coating operation can substantially be expanded.

Finally, a top coating prepared immediately prior to the application by mixing the afore-mentioned fluorine-containing copolymer with the polyisocyanate, is applied once or more times onto the sealer coating layer by means of a brush, a spray coating machine or a roller coating device, to give a dried layer thickness of from about 15 to 70μ, followed by air-drying. Usually, the top coating layer will be formed in two to four days by air-drying.

The substrates to which the process of the present invention may be applied, include metal materials such as steel, metallizing steel (i.e. a steel plate coated with zinc or a zinc-aluminum alloy by spraying) or a galvanized steel plate and those obtained by applying usual wash primers on these metal materials.

Thus, the coating layer obtained by the process of the present invention has minimum oxygen permeability, whereby the anticorrosive property can be maintained for an extended period of time to effectively prevent the corrosion of the substrate and the coating layer has a superior long lasting weatherability. Accordingly, the intervals for recoating can be extended to such a great extent that can never be expected with the conventional coating systems, and the costs or the number of process steps required for the recoating can remarkably be reduced. Further, the coating layer obtained by the top coating of the present invention has superior recoatability and thus is extremely advantageous for the recoating operation.

Now, the present invention will be described in further detail with reference to the Examples. In the Examples, "parts" or "0/0" mean "parts by weight" or "0/0 by weight".

EXAMPLE 1

(i) Preparation of a primer coating

Boiled oil of linseed oil: 10 parts
Soybean modified middle oil-type alkyd resin (solid content): 10 parts
Calcium carbonate: 50 parts
Red iron oxide: 5 parts
Drier: 2 parts
Antiskinning agent: 1 part
Precipitation preventing agent: 1 part
Mineral sprit: 20 parts The mixture was kneaded in a pot mil for 24 hours to obtain Primer Coating A.

(ii) Preparation of a binder coating

Boiled oil of linseed oil: 5 parts
Phenol-modified alkyd resin(solid content) 15 parts
Synthetic micaceous iron oxide: 40 parts
Calcium carbonate: 10 parts
Drier: 1 part
Antiskinning agent: 1 part
Precipitating preventing agent: 1 part
Mineral sprit: 20 parts The mixture was kneaded in a pot mil for 24 hours to obtain Binder Coating A.

(iii) Preparation of a top coating 100 parts of a fluorine-containing four-component copolymer comprising chlorotrifluoroethylene, cyclohexylvinyl ether, ethylvinyl ether and hydroxybutylvinyl ether units in a ratio of 51.2 molar %, 17.1 molar %, 22.5 molar % and 9.1 molar %, respectively, and having an intrinsic viscosity (in tetrahydrofuran at 30° C.) ([η]) of 0.21 dl/g and a glass transition temperature (measured by DSC at a temperature raise rate of 10° C./min.) (Tg) of 45° C., was dissolved in a solvent mixture comprising 40 parts of xylene and 120 parts of methylisobutyl ketone, and then 42 parts of titanium oxide was added. The mixture was kneaded in a pot mill for 24 hours to obtain a main component for the top coating.

Immediately prior to the application of the coating, a hardener composed of 8 parts of hexamethylenediisocyanate and $15 \times 10^{-7}$ parts of dibutyl tin-dilaurate was mixed with the above main component to obtain a Top Coating A.

(iv) Preparation of a test piece

The abovementioned Primer Coating A was air-sprayed twice at a interval of one day onto a sand brust-treated steel plate (JIS G-3141; 70×150×1.6 mm) and dried at room temperature for one week to obtain a primer coating layer having a thickness of 80μ.

Then, the abovementioned Binder Coating A was air-sprayed thereon and dried at room temperature for three days to obtain a binder coating layer having a thickness of 50μ.

Finally, the abovementioned Top Coating A was air-sprayed onto the binder coating layer and dried at room temperature for two days to obtain a top coating layer having a thickness of 30μ.

The test piece thus obtained was subjected to the comparative test described hereinafter.

EXAMPLE 2

(i) Preparation of a primer coating

Linseed oil: 17 parts
Red lead: 76 parts
Drier: 2 parts
Precipitation preventing agent: 2 parts
Antiskinning agent: 2 parts
Mineral sprit: 20 parts The mixture was kneaded in a pot mil for 24 hours to obtain Primer Coating B.

(ii) Preparation of a binder coating

Soybean oil-modified middle oil-type alkyd resin (solid content): 15 parts
Synthetic micaceous iron oxide: 40 parts
Calcium carbonate: 5 parts
Drier: 5 parts
Antiskinning agent: 1 part
Precipitation preventing agent: 1 part
Mineral sprit: 30 parts This mixture was kneaded in a pot mil for 24 hours to obtain Binder Coating B.

(iii) Preparation of a top coating

Top Coating B was prepared in the same manner as in Example 1 with use of a fluorine-containing four component copolymer comprising tetrafluoroethylene, cyclohexylvinyl ether, ethylvinyl ether and hydroxybutylvinyl ether units in a ratio of 50.8 molar %, 16.9 molar %, 22.8 molar % and 9.5 molar %, respectively, and having an intrinsic viscosity [η] of 0.23 dl/g and a glass transition temperature (Tg) of 27° C.

(iv) Preparation of a test piece

A test piece was prepared in the same manner as in (iv) of Example 1 and subjected to a comparative test.

EXAMPLE 3

(i) Preparation of a primer coating

Soybean oil-modified middle oil-type alkyd resin (solid content): 25 parts
Red iron oxide: 45 parts
Drier: 3 parts
precipitation preventing agent: 2 parts
Mineral sprit: 10 parts
Lead suboxide: 20 parts The mixture was kneaded in a pot mil for 24 hours to obtain Primer Coating C.

(ii) Preparation of a binder coating

Binder Coating A as used in Example 1 was used.

(iii) Preparation of a top coating

Top Coating B as used in Example 2 was used.

(iv) Preparation of a test piece

A test piece was prepared in the same manner as in (iv) of Example 1 and subjected to a comparative test.

EXAMPLE 4

(i) Preparation of a primer coating

Soybean oil-modified middle oil-type alkyd resin (solid content): 30 parts
Red iron oxide: 40 parts
Zinc chromate: 30 parts
Drier: 3 parts
Precipitation preventing agent: 2 parts
Mineral sprit: 20 parts The mixture was kneaded in a pot mil for 24 hours to obtain Primer Coating D.

(ii) Preparation of a binder coating

Binder Coating B as used in Example 2 was used.

(iii) Preparation of a top coating

Top Coating A as used in Example 1 was used.

(iv) Preparation of a test piece

A test piece was prepared in the same manner as in (iv) of Example 1 and subjected to a comparative test.

EXAMPLES 5 TO 8

Using the coating systems as identified in Table 1, test pieces were prepared in the same manner as in (iv) of Example 1 and subjected to comparative tests.

TABLE 1

| | Coating Systems of Examples 5 to 8 | | | |
| --- | --- | --- | --- | --- |
| | Exp. 5 | Exp. 6 | Exp. 7 | Exp. 8 |
| Primer coating | A | B | C | D |
| Binder coating | B | A | A | B |
| Top coating | B | A | B | A |

COMPARATIVE EXAMPLE 1

(i) Preparation of a primer coating

Primer Coating A as used in Example 1 was used.

(ii) Preparation of a binder coating

Binder Coating A as used in Example 1 was used.

(iii) Preparation of a top coating

Soybean oil-modified middle oil-type alkyd resin (solid content): 25 parts
Titanium dioxide: 25 parts
Calcium carbonate: 10 parts
Drier: 5 parts
Precipitation preventing agent: 1 part
Antiskinning agent: 1 part
mineral sprit: 15 parts The mixture was kneaded in a pot mil for 24 hours to obtain Top Coating C.

(iv) Preparation of a test piece

A test piece was prepared in the same manner as in (iv) of Example 1 and subjected to a comparative test.

COMPARATIVE EXAMPLE 2

(i) Preparation of a primer coating

Primer Coating A as used in Example 1 was used.

(ii) Preparation of a binder coating

Binder Coating A as used in Example 1 was used.

(iii) Preparation of a top coating

Chlorinated rubber: 25 parts
Chlorinated paraffin 40%: 10 parts
Titanium dioxide: 15 parts
Precipitation preventing agent: 1 part
Xylol: 64 parts The mixture was kneaded in a pot mil for 24 hours to obtain Top Coating D.

(iv) Preparation of a test piece

A test piece was prepared in the same manner as in (iv) of Example 1 and subjected to a comparative test.

COMPARATIVE EXAMPLES 3 TO 5

Using the coating systems as identified in Table 2, test pieces were prepared in the same manner as in (iv) of Example 1 and subjected to comparative tests. In the cases where no binder coating was used, the top coating was directly applied onto the primer coating.

TABLE 2

Coating Systems of Comparative Example 3 to 5

|  | Comparative Example 3 | Comparative Example 4 | Comparative Example 5 |
|---|---|---|---|
| Primer coating | A | B | B |
| Binder coating | Top Coating C was used | — | A |
| Top coating | C | A | E[1] |

Note:
[1] A mixture comprising 40 parts of a silicone-alkyd resin solution (known by the trade name YR 3116, manufactured by Toshiba Silicone Company Ltd.; 48.3% of non-volatile component), 20 parts of titanium dioxide, 0.5 part of metal drier, 1 part of a precipitation preventing agent and 38.5 parts of mineral spirit, was kneaded in a pot mil for 24 hours to obtain Top coating E.

The test pieces obtained by Examples 1 to 8 and Comparative Examples 1 to 5 were subjected to peeling tests, impact tests, salt spray tests, salt water immersion tests and sunshine weathering tests, and oxygen permeability was measured with respect to the isolated top coating layer of each test piece. The results thereby obtained are shown in Tables 3 and 4.

TABLE 3

Comparative test results

| | Anticorrosion tests | | | | Peeling tests After salt water immersion for 90 days | Weatherability Sunshine weathering tests | | |
|---|---|---|---|---|---|---|---|---|
| | Salt spray test | | Salt water immersion test | | | Gloss retention | Appearance | Lifting |
| | Appearance | tan δ | Appearance | tan δ | | | | |
| Exp. 1 | no change | 0.19 | no change | 0.24 | 100/100 | 93% | no change | none |
| Exp. 2 | " | 0.22 | " | 0.12 | 100/100 | 95% | " | none |
| Exp. 3 | " | 0.26 | " | 0.19 | 100/100 | 92% | " | none |
| Exp. 4 | " | 0.29 | " | 0.27 | 100/100 | 93% | " | none |
| Exp. 5 | " | 0.18 | " | 0.23 | 100/100 | 96% | " | none |
| Exp. 6 | " | 0.21 | " | 0.16 | 100/100 | 91% | " | none |
| Exp. 7 | " | 0.30 | " | 0.18 | 100/100 | 93% | " | none |
| Exp. 8 | " | 0.24 | " | 0.28 | 100/100 | 94% | " | none |
| Comp. Exp. 1 | blisters | 1.32 | blisters | 0.82 | 40/100 | 20% | color change-chalking | none |
| Comp. Exp. 2 | color change | 0.63 | no change | 0.42 | 80/100 | 30% | color change-chalking | none |
| Comp. Exp. 3 | blisters | 0.96 | blisters | 1.21 | 30/100 | 18% | color change-chalking | none |
| Comp. Exp. 4 | no change | 0.22 | no change | 0.26 | 95/100 | 92% | no change | practically useless because of lifting |
| Comp. Exp. 5 | " | 0.48 | " | 0.65 | 85/10 | 30% | color change | none |

TABLE 4

Oxygen permeability of the top coating layers

| Top coatings | Resin-types | Oxygen permeability [ml(STP) cm/cm² sec cm Hg] × 10¹⁰ |
|---|---|---|
| A | Fluorinated resin-type | 0.13 |
| B | Fluorinated resin-type | 0.11 |
| C | Alkyd resin-type | 0.76 |
| D | Chlorinated rubber-type | 1.2 |
| E | Silicone alkyd resin-type | 0.92 |

Note:
The oxygen permeability was measured by a gas permeability measuring apparatus of Product Science Research Center model (manufactured by Rika Seiki K. K.).

EXAMPLE 9

(i) Preparation of a primer coating

Primer Coating A as used in Example 1 was used.

(ii) Preparation of a binder coating

Binder Coating A as used in Example 1 was used.

(iii) Preparation of sealer coating

Main component
Bisphenol-type epoxy resin (known by the trade name Epikote 828, manufactured by Shell Chemical Co.; epoxy equivalent of from 184 to 194): 25 parts
Titanium dioxide: 20 parts
Talc: 15 parts
Precipitated barium sulfate: 15 parts
Precipitation preventing agent (organic bentonite): 2 parts
Methylisobutyl ketone: 13 parts
Xylol: 10 parts The above composition was kneaded by rollers to obtain a main component.

Hardener
Polyamide resin (known by the trade name Tohimide #245, manufactured by Fuji Chemical Industry Co., Ltd.; active hydrogen equivalent of 90): 60 parts
Isobutanol: 40 parts The above composition was stirred by a disperser to obtain a hardener. Immediately prior to the application, 80 parts of the above main component and 20 parts of the hardener were mixed to obtain Sealer Coating A.

(iv) Preparation of a top coating

Top Coating A as used in Example 1 was used.

(v) Preparation of a test piece

The abovementioned Primer Coating A was air-sprayed twice at an interval of one day onto a sand brust-treated steel plate (JIS G-3141: 70×150×1.6 mm) and dried at room temperature for one week to obtain a primer coating layer having a thickness of 80μ.

Then, the abovementioned Binder Coating A was air-sprayed thereon and dried at room temperature for three days to obtain a binder coating layer having a thickness of 50μ. The above-mentioned Sealer Coating A was air-sprayed onto the binder coating layer and dried at room temperature for 24 hours to obtain a sealer coating layer having a thickness of 20μ.

Finally, the abovementioned Top Coating A was air-sprayed onto the sealer coating layer and dried at room temperature for two days to obtain a top coating layer having a thickness of 30μ.

The test piece thus obtain was subjected to a comparative test as described hereinafter.

EXAMPLE 10

(i) Preparation of a primer coating

Primer Coating B as used in Example 2 was used.

(ii) Preparation of a binder coating

Binder Coating B as used in Example 2 was used.

(iii) Preparation of a sealer coating

Sealer Coating A as used in Example 9 was used.

(iv) Preparation of a top coating

Top Coating B as used in Example 2 was used.

(v) Preparation of a test piece

A test piece was prepared in the same manner as in (v) of Example 9 and subjected to a comparative test.

EXAMPLE 11

(i) Preparation of a primer coating

Primer Coating C as used in Example 3 was used.

(ii) Preparation of a binder coating

Binder Coating A as used in Example 1 was used.

(iii) Preparation of a sealer coating

Sealing Coating A as used in Example 9 was used.

(iv) Preparation of a top coating

Top coating B as used in Example 2 was used.

(v) Preparation of a test piece

A test piece was prepared in the same manner as in (v) of Example 9 and then subjected to a comparative test.

EXAMPLE 12

(i) Preparation of a primer coating

Primer Coating D as used in Example 4 was used.

(ii) Preparation of a binder coating

Binder Coating B as used in Example 2 was used.

(iii) Preparation of a sealer coating

Sealer Coating A as used in Example 9 was used.

(iv) Preparation of a top coating

Top Coating A as used in Example 1 was used.

(v) Preparation of a test piece

A test piece was prepared in the same manner as in (v) of Example 9 and then subjected to a comparative test.

EXAMPLE 13

(i) Preparation of a primer coating

Primer Coating A as used in Example 1 was used.

(ii) Preparation of a binder coating

Binder Coating A as used in Example 1 was used.

(iii) Preparation of a sealer coating

Main component
Bisphenol-type epoxy resin (known by the trade name Epikote 828, manufactured by Shell Chemical Co. Ltd.; epoxy equivalent of from 184 to 194): 25 parts
Micaceous iron oxide: 35 parts
Talc: 15 parts
Precipitation preventing agent (organic bentonite): 2 parts
Methylisobutyl ketone: 13 parts
Xylol: 10 parts The above composition was kneaded by rollers to obtain a main component.

Hardener

Polyamide resin (known by the trade name Tohmide #245, manufactured by Fuji Chemical Industry Co. Ltd.; active hydrogen equivalent of 90): 60 parts
Isobutanol: 40 parts The above composition was stirred by a disperser to obtain a hardener. Immediately prior to the application, 80 parts of the above main component and 20 parts of the hardener were mixed to obtain a Sealer Coating B.

(iv) Preparation of a top coating

Top Coating B as used in Example 2 was used.

(v) Preparation of a test piece

A test piece was prepared in the same manner as in (v) of Example 9 and then subjected to a comparative test.

EXAMPLES 14 TO 16

Using the coating systems as identified in Table 5, test pieces were prepared in the same manner as in (v) of Example 9 and then subjected to comparative tests.

TABLE 5

| Coating systems of Examples 14 to 16 | | | |
| --- | --- | --- | --- |
| | Exp. 14 | Exp. 15 | Exp. 16 |
| Primer coating | B | C | D |
| Binder coating | A | A | B |
| Sealer coating | B | B | B |
| Top coating | A | B | A |

The test pieces obtained by Examples 9 to 16 were subjected to peeling tests, impact tests, salt spray tests, salt water immersion tests and sunshine weathering tests. The results thereby obtained are shown in Table 6.

Further, the minimum intervals for the application of the respective top coatings in Examples 9 to 16 were measured and the results thereby obtained are shown in Table 7 together with the results similarly obtained in Comparative Examples 1 to 5.

TABLE 7

| | Minimum interval for application of the top coating |
| --- | --- |
| Example 9 | 16 hrs. |
| Example 10 | 16 hrs. |
| Example 11 | 16 hrs. |
| Example 12 | 16 hrs. |
| Example 13 | 16 hrs. |
| Example 14 | 16 hrs. |
| Example 15 | 16 hrs. |
| Example 16 | 16 hrs. |

TABLE 7-continued

| | Minimum interval for application of the top coating |
| --- | --- |
| Comparative Example 1 | 72 hrs. |
| Comparative Example 2 | 72 hrs. |
| Comparative Example 3 | 72 hrs. |
| Comparative Example 4 | 24 hrs. |
| Comparative Example 5 | 48 hrs. |

It is evident from the results of the comparative tests (Tables 3 and 6) that the anticorrosive properties (the salt spray test and salt water immersion test) if the test pieces obtained by the anticorrosive coating process of the present invention are far superior to those of the test pieces obtained by the comparative examples.

Further, it is evident from Tables 3 and 4 that the coating layers obtained by the process of the present invention are superior to the conventional coating layers also in the weatherability (sunshine weathering tests).

The reason why such superior anticorrosive coating layers are obtainable by the present invention, is not clearly understood. However, it may be attributable to the fact that in the comparison of the oxygen permeability (Table 4) which is a main factor for corrosion, the oxygen permeability of the top coating layers obtained by the process of the present invention is extremely smaller than that of the conventional top coating layers at the level of about 1/5 to 1/10.

Further, it is evident from Table 7 that when sealer coatings are used in the anticorrosive coating process of the present invention, the minimum intervals for the application of the top coatings can be shortened to a great extent.

We claim:

TABLE 6

| | Comparative test results | | | | | | |
| --- | --- | --- | --- | --- | --- | --- | --- |
| | Anticorrosion tests | | | | | Weatherability | |
| | | | | | Peeling tests After salt water immersion for 90 days | Sunshine weathering tests | |
| | Salt spray test | | Salt water immersion test | | | | |
| | Appearance | tan δ | Appearance | tan δ | | Gloss retention | Appearance | Lifting |
| Exp. 9 | no change | 0.18 | no change | 0.17 | 100/100 | 93% | no change | none |
| Exp. 10 | " | 0.16 | " | 0.26 | 100/100 | 95% | " | none |
| Exp. 11 | " | 0.23 | " | 0.29 | 100/100 | 92% | " | none |
| Exp. 12 | " | 0.29 | " | 0.18 | 100/100 | 93% | " | none |
| Exp. 13 | " | 0.17 | " | 0.24 | 100/100 | 96% | " | none |
| Exp. 14 | " | 0.19 | " | 0.22 | 100/100 | 91% | " | none |
| Exp. 15 | " | 0.27 | " | 0.16 | 100/100 | 93% | " | none |
| Exp. 16 | " | 0.24 | " | 0.30 | 100/100 | 94% | " | none |

Note:
The testing methods were the same as described with repsect to Table 3.

1. An anticorrosive coating process which comprises:
   (i) a step of forming a primer coating layer by applying on a substrate an oil-type anticorrosive coating or an alkyd resin-type anticorrosive coating as a primer coating, followed by air-drying,
   (ii) a step of forming a binder coating layer by applying on the primer coating layer a phenol-modified alkyd resin-type coating containing a flaky pigment, followed by air-drying, and
   (iii) a step of forming a top coating layer by applying on the binder layer a top coating comprising (a) a fluorine-containing copolymer composed of from 40 to 60 molar % of a fluoroolefin, from 5 to 45 molar % of cyclohexylvinyl ether, from 5 to 45 molar % of an alkylvinyl ether, from 3 to 15 molar % of a hydroxyalkylvinyl ether and from 0 to 30 molar % of other comonomer and (b) a polyisocyanate, followed by air-drying.

2. The anticorrosive coating process according to claim 1 wherein the flaky pigment is micaceous iron oxide, glass flakes or aluminum powder, or a mixture thereof.

3. The anticorrosive coating process according to claim 1 wherein the fluoroolefin is chlorotrifluoroethylene and/or tetrafluoroethylene.

4. The anticorrosive coating process according to claim 1 wherein the alkylvinyl ether is an alkylvinyl ether containing a straight chain or branched chain alkyl group having from 2 to 8 carbon atoms.

5. The anticorrosive coating process according to claim 1 wherein the hydroxyalkylvinyl ether is hydroxybutylvinyl ether.

6. The anticorrosive coating process which comprises:
   (i) a step of forming a primer coating layer by applying on a substrate an oil-type anticorrosive coating or an alkyd resin-type anticorrosive coating as a primer coating, followed by air-drying,
   (ii) a step of forming a binder coating layer by applying on the primer coating layer a phenol-modified alkyd resin-type coating containing a flaky pigment, followed by air-drying,
   (iii) a step of forming a sealer coating layer by applying on the binder coating layer an epoxy resin coating, followed by air-drying, and
   (iv) a step of applying thereon a top coating comprising (a) a fluorine-containing copolymer composed of from 40 to 60 molar % of a fluoroolefin, from 5 to 45 molar % of cyclohexylvinyl ether, from 5 to 45 molar % of an alkylvinyl ether, from 3 to 15 molar % of a hydroxyalkylvinyl ether and from 0 to 30 molar % of other comonomer and (b) a polyisocyanate, followed by air-drying.

7. The anticorrosive coating process according to claim 6 wherein the flaky pigment is micaceous iron oxide, glass flakes or aluminum powder, or a mixture thereof.

8. The anticorrosive coating process according to claim 6 wherein the fluoroolefin is chlorotrifluoroethylene and/or tetrafluoroethylene.

9. The anticorrosive coating process according to claim 6 wherein the alkylvinyl ether is an alkylvinyl ether containing a straight chain or branched chain alkyl group having from 2 to 8 carbon atoms.

10. The anticorrosive coating process according to claim 6 wherein the hydroxyalkylvinyl ether is hydroxybutylvinyl ether.

11. The anticorrosive coating process according to claim 6 wherein the coating forming the sealer coating layer is composed of an epoxy resin and a flaky pigment.

12. The anticorrosive coating process according to claim 11 wherein the flaky pigment is micaceous iron oxide, glass flakes or aluminum powder, or a mixture thereof.

* * * * *